United States Patent
Hirth et al.

(10) Patent No.: US 12,000,320 B2
(45) Date of Patent: Jun. 4, 2024

(54) ELECTRICAL FEEDTHROUGH

(71) Applicant: Vitesco Technologies GmbH, Regensburg (DE)

(72) Inventors: Peter Hirth, Rösrath (DE); Stefan Ahlers, Bergisch Gladbach (DE)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 0 days.

(21) Appl. No.: 18/023,439

(22) PCT Filed: Aug. 2, 2021

(86) PCT No.: PCT/EP2021/071542
§ 371 (c)(1),
(2) Date: Feb. 27, 2023

(87) PCT Pub. No.: WO2022/043006
PCT Pub. Date: Mar. 3, 2022

(65) Prior Publication Data
US 2023/0313720 A1    Oct. 5, 2023

(30) Foreign Application Priority Data
Aug. 28, 2020 (DE) .................... 10 2020 210 889.7

(51) Int. Cl.
*F01N 3/20* (2006.01)
*H01B 3/12* (2006.01)
(Continued)

(52) U.S. Cl.
CPC ............. *F01N 3/2026* (2013.01); *H01B 3/12* (2013.01); *H01B 7/0208* (2013.01); *H01B 7/20* (2013.01)

(58) Field of Classification Search
CPC ............. F01N 13/0097; F01N 2240/16; F01N 3/2026; F01N 3/28; H01B 3/12;
(Continued)

(56) References Cited

U.S. PATENT DOCUMENTS

| | | | | |
|---|---|---|---|---|
| 3,892,536 A | * | 7/1975 | Roeser .................. | F01N 3/2882 422/221 |
| 4,449,362 A | * | 5/1984 | Frankenberg ......... | F01N 13/009 60/303 |

(Continued)

FOREIGN PATENT DOCUMENTS

| | | |
|---|---|---|
| DE | 4209195 | 9/1993 |
| DE | 4303581 | 8/1994 |

(Continued)

OTHER PUBLICATIONS

Office Action of corresponding German Patent Application No. DE 10 2020 210 889.7.
https://de.wikipedia.org/wiki/Kabel.

*Primary Examiner* — Jesse S Bogue
(74) *Attorney, Agent, or Firm* — Cozen O'Connor

(57) ABSTRACT

A current feedthrough for an electrically heatable catalytic converter, which has inside it at least one electrical conductor that can be electrically contacted by the current feedthrough, a central electrically conductive inner conductor, which is guided from the interior of the catalytic converter through the outer housing wall thereof, an electrical insulation layer, which surrounds the electrically conductive inner conductor on the radially outer surface thereof, and a metallic outer tube, in which the electrically conductive inner conductor and the electrical insulation layer are accommodated.

9 Claims, 1 Drawing Sheet

(51) Int. Cl.
  *H01B 7/02*    (2006.01)
  *H01B 7/20*    (2006.01)

(58) Field of Classification Search
  CPC .... H01B 7/0208; H01B 7/20; H05B 2214/03;
                                H05B 3/08; Y02T 10/12
  See application file for complete search history.

(56) References Cited

U.S. PATENT DOCUMENTS

| | | | | | |
|---|---|---|---|---|---|
| 5,053,603 | A | * | 10/1991 | Wagner | H05B 3/76 219/205 |
| 5,271,906 | A | * | 12/1993 | Yuuki | F01N 3/0871 422/177 |
| 5,582,805 | A | * | 12/1996 | Yoshizaki | F01N 13/009 422/174 |
| 5,744,104 | A | * | 4/1998 | Sakurai | B01J 35/0033 422/174 |
| 5,902,557 | A | * | 5/1999 | Yotsuya | F01N 3/2026 422/174 |
| 6,060,699 | A | * | 5/2000 | Sakurai | F01N 3/2026 219/205 |
| 2006/0080953 | A1 | * | 4/2006 | Maus | F01N 13/0093 60/297 |
| 2012/0285724 | A1 | * | 11/2012 | Oya | H01B 3/427 174/120 C |
| 2017/0011820 | A1 | * | 1/2017 | Yin | H01B 3/12 |

FOREIGN PATENT DOCUMENTS

| | | |
|---|---|---|
| DE | 69732319 | 12/2005 |
| EP | 0669453 | 8/1995 |
| EP | 0739152 | 10/1996 |

* cited by examiner

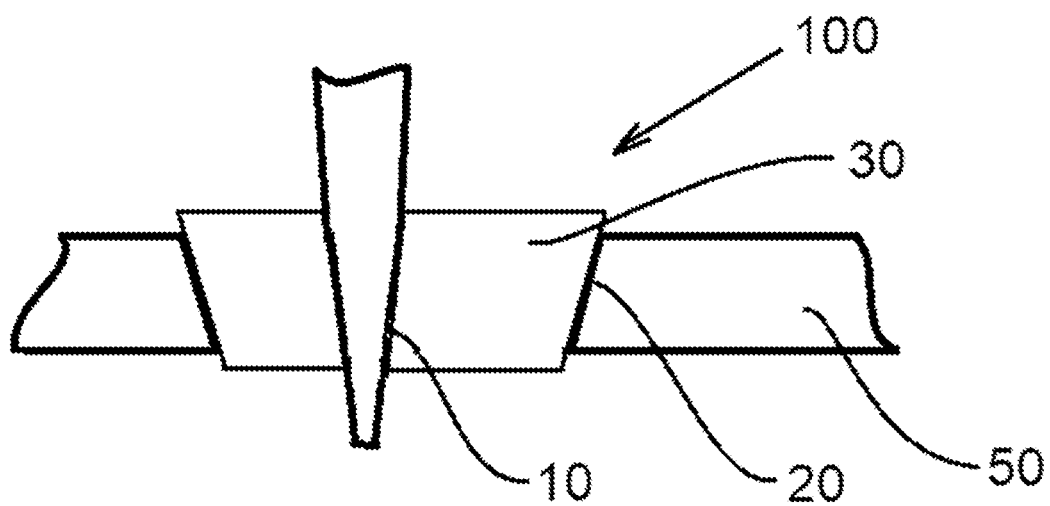

ELECTRICAL FEEDTHROUGH

CROSS REFERENCE TO RELATED APPLICATIONS

This is a U.S. national stage of Application No. PCT/EP2021/071542 filed Aug. 2, 2021 Priority is claimed on German Application No. DE 10 2020 210 889.7 filed Aug. 28, 2020 the content of which is incorporated herein by reference.

BACKGROUND OF THE INVENTION

1. Field of the Invention

The disclosure relates to a current feedthrough for an electrically heatable catalytic converter, wherein the catalytic converter has inside it at least one electrical conductor, which can be electrically contacted by the current feedthrough, a central electrically conductive inner conductor, which is guided from the interior of the catalytic converter through the outer housing wall thereof, an electrical insulation layer, which surrounds the electrically conductive inner conductor on the radially outer surface thereof, and a metallic outer tube, in which the electrically conductive inner conductor and the electrical insulation layer are accommodated.

2. Description of Related Art

Electrically heatable catalytic converters are known in the prior art. These generally have a conductor, through which a current is passed and which is connected to a voltage source by electrical contact. Since the catalytic converters are designed to be outwardly gas-tight, there are special electrical feedthroughs, which are guided through the outer casing of the catalytic converter and are contacted with the heating conductor in the interior.

The electrical feedthrough consists here generally of an electrical conductor, which is embedded in an electrically non-conductive medium, for example a ceramic. The non-conductive material can in turn be surrounded by a metal sleeve, which by a joining technique can be connected to the metallic casing of the catalytic converter permanently and in a manner resistant to mechanical loads. The electrical feedthrough, as is known in the prior art, thus usually has a central current conductor, for example a pin, a ceramic insulation, and a metallic outer sleeve.

A disadvantage of the current feedthroughs known in the prior art is in particular that, due to the integrally bonded connection between the current-conducting pin and the components in the interior of the catalytic converter that are to be electrically contacted, a high thermal load occurs in the outer region of the current feedthrough. The thermal load is created either by convection of the exhaust-gas energy towards the current feedthrough or by the heating of the heating conductor itself, which is in direct integrally bonded connection to the current feedthrough. If the thermal loads are too high, this can lead, in particular at the contact region of the current feedthrough in the outer region, to damage to the insulation of the electrical feed line or the connection means between the feed line and the current feedthrough.

In addition, it is disadvantageous that the often-used magnesium oxide is highly hydrophilic and therefore may be washed out from the insulation layer. On the one hand, the insulating effect is thus impaired, and on the other hand the durability of the feedthrough is also reduced, since the structural integrity of the feedthrough is jeopardized as a result of the insulation layer having been washed out. It is also disadvantageous that with the previously known electrical feedthroughs it is not possible to prevent flashovers adequately between the regions separated by the insulation layer. In particular, it is not possible to produce an overhang of the insulation layer beyond the elements to be insulated, which prevents an electrical flashover effectively.

SUMMARY OF THE INVENTION

An object of one aspect of the present invention is therefore to create an electrical current feedthrough for an electrically heatable catalytic converter which is durable and in particular prevents electrical flashovers.

BRIEF DESCRIPTION OF THE DRAWINGS

The FIGURE is a schematic representation of an electrical current feedthrough for an electrically heatable catalytic converter.

DETAILED DESCRIPTION OF THE PRESENTLY PREFERRED EMBODIMENTS

An exemplary aspect of the invention relates to a current feed-through for an electrically heatable catalytic converter, wherein the catalytic converter has in the interior thereof at least one electrical conductor, which is electrically contactable by the current feed-through, having a central electrically conductive inner conductor, which is guided from the interior of the catalytic converter through the outer housing wall thereof, having an electrical insulation layer, which surrounds the electrically conductive inner conductor on its radial outer face, and having a metallic outer tube, in which the electrically conductive inner conductor and the electrical insulation layer are accommodated. The inner conductor is thus effectively electrically insulated by the insulation layer surrounding it with respect to the outer tube, which surrounds the insulation layer.

The FIGURE shows, a current feedthrough 100 for an electrically heatable catalytic converter 50, wherein the catalytic converter has inside it at least one electrical conductor, which can be electrically contacted by the current feedthrough 100, having a central electrically conductive inner conductor 10, which is guided from the interior of the catalytic converter 50 through the outer housing wall thereof, having an electrical insulation layer 30, which surrounds the electrically conductive inner conductor 10 on the radially outer surface thereof, and having a metallic outer tube 20, in which the electrically conductive inner conductor 10 and the electrical insulation layer 30 are accommodated.

It is particularly advantageous if the inner conductor and/or the outer tube is conical. Here, conical means in particular that the elements taper or widen conically along their axial main extent. A form fit between the inner conductor and the outer tube can thus be produced, which is beneficial for stability. The outer tube can form, for example, a conical sleeve into which the inner conductor, which likewise is conical, is inserted. Due to the conical design, the inner conductor can be inserted into the outer tube only until the insertion is delimited by the form fit. By applying a force component to the inner conductor during the insertion process, a frictional engagement between the two elements can additionally be achieved. This bracing or the occurrence of the frictional engagement between the inner conductor and the outer tube is additionally reinforced by the insulation layer arranged in between.

It is also advantageous if the insulation layer is arranged between the inner conductor and the outer tube and is formed from a non-metallic material.

The insulation layer is preferably formed from an oxidic material. A key advantage of an oxidic material, such as a ceramic, is that the electrical insulation properties are very good. In addition, oxidic materials as are preferably used for the electrical insulation have specific coefficients of thermal expansion, which in comparison to the coefficients of thermal expansion of the inner conductor and/or the outer tube have a difference of approximately <3 ppm/K. They particularly preferably have a difference of <2 ppm/K. The difference is very particularly preferably <1 ppm/K.

A preferred exemplary embodiment is characterized in that the oxidic material of the insulation layer is a non-porous ceramic. The porosity is the ratio of the pore volume to total volume, which comprises the volume of the pores and the volume of the solid material. The porosity is preferably stated in percent. The lower the porosity, the lower the likelihood that diffusion processes occur. An extreme value for the porosity is a porosity of 0%. Such a low porosity can be achieved approximately for example with materials such as aluminium oxide ($Al_2O_3$). A porosity of less than 1% is particularly preferred.

It is also preferred if the oxidic material of the insulation layer is a porous ceramic, wherein the ceramic is treated with an additional substance as pore filler. Alternatively or additionally, a substance can also be applied as a surface sealer. It is characteristic for a pore filler that the substance has a mean particle size which lies below the mean pore size in order to fill out the pores created by the porosity. Pore fillers can preferably consist of oxidic non-electrically conductive ceramics, such as silicon oxide ($SiO_2$) or aluminium oxide ($Al_2O_3$). The pore size varies depending on the ceramic used, and therefore the preferred ideal particle size is to be adapted to the ceramic used.

A surface sealer can consist of the same materials as a pore filler, for example; in contrast to a pore filler, the surface sealer serves to seal the surface and to produce a closed edge layer. For this purpose, a sintering treatment preferably follows after the application of the surface sealer. The minimum particle size in a surface sealer is larger than the mean pore size of the ceramic.

A further preferred property of a surface sealer is the change to the surface property from hydrophilic to hydrophobic, whereby a wetting of the surface with water can be prevented.

Ceramics with higher porosity are then to be preferred in particular if the materials have very different coefficients of thermal expansion, since the pores have a certain elasticity, which can compensate for the differences in the coefficients of thermal expansion.

In addition, it is advantageous if a ceramic adhesive is arranged between the inner conductor and the insulation layer and/or between the insulation layer and the outer tube. A ceramic adhesive is advantageous in particular in order to produce a good and durable connection between the inner conductor and the outer tube. Ceramic adhesives have the advantage in particular that they bond very well to the ceramic insulation layer.

It is furthermore advantageous if the insulation layer at the end lying inside the catalytic converter and/or at the end lying outside the catalytic converter has a longer extent in the axial direction of the current feedthrough than the outer tube. By producing an axial overhang of the insulation layer beyond the outer tube, the distance that would have to be overcome in the event of an electrical flashover is effectively significantly increased. The system is thus more robust, in particular for use with higher operating voltages.

It is also expedient if the outer tube is prestressed relative to the inner conductor by the use of a thermal joining process. By producing a prestress, the stability of the electrical feedthrough can be improved in particular. The inner conductor is thus better connected to the outer tube since an additional frictional engagement is produced. The electrical feedthrough is thus more robust in particular with respect to the mechanical and thermal loads occurring during operation.

In addition, it is advantageous if the insulation layer is constructed in a number of layers in the radial direction of the current feedthrough, wherein the individual layers are formed by materials having different coefficients of thermal expansion. In particular, an approximation of the coefficients of thermal expansion between the metallic materials of the inner conductor and of the outer tube with the ceramic material of the electrical insulation layer can be improved hereby advantageously. In particular, it is attempted to keep the difference between the coefficients of thermal expansion between directly adjacent layers as small as possible. In particular, the risk of damage on account of stresses in the electrical feedthrough that may be caused by thermal loads is to be minimized hereby.

Furthermore, it is expedient if the insulation layer has at least a first layer which produced the electrical insulation between the inner conductor and the outer tube, wherein the layers arranged between this first layer and the inner conductor and/or the outer tube have a coefficient of thermal expansion of which the value lies between the coefficient of thermal expansion of the first layer and the coefficient of thermal expansion of the inner conductor and/or the outer tube.

Just an individual layer may act in an electrically insulating manner, however, a plurality of layers may also take on this function. The respective coefficients of thermal expansion of the layers adjacent to the electrically insulating layer lies preferably between the coefficient of thermal expansion of the electrically insulating layer itself and the particular coefficient of thermal expansion of the inner conductor or the outer tube. It is thus attempted to keep the differences between the coefficients of thermal expansion of the individual layers as small as possible and to produce a uniform profile of the coefficients of thermal expansion in the radial direction of the electrical feedthrough. This is intended to reduce stresses caused by thermal loads.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A current feedthrough for an electrically heatable catalytic converter, wherein the catalytic converter has inside it at least one electrical conductor, configured to be electrically contacted by the current feedthrough, comprising:
   a central electrically conductive inner conductor, which is guided from an interior of the catalytic converter through an outer housing wall thereof;
   an electrical insulation layer, which surrounds the central electrically conductive inner conductor on a radially outer surface thereof; and
   a metallic outer tube, in which the central electrically conductive inner conductor and the electrical insulation layer are accommodated,
   wherein the electrical insulation layer at an end lying inside the catalytic converter and/or at an end lying outside the catalytic converter has a longer extent in an axial direction of the current feedthrough than the metallic outer tube.

2. The current feedthrough as claimed in claim 1, wherein the central electrically conductive inner conductor and/or the metallic outer tube is conical.

3. The current feedthrough as claimed in claim 1, wherein the electrical insulation layer is arranged between the central electrically conductive inner conductor and the metallic outer tube and is formed from a non-metallic material.

4. The current feedthrough as claimed in claim 3, wherein an oxidic material of the electrical insulation layer is a non-porous ceramic.

5. The current feedthrough as claimed in claim 1, wherein a ceramic adhesive is arranged between the central electrically conductive inner conductor and the electrical insulation layer and/or between the electrical insulation layer and the metallic outer tube.

6. The current feedthrough as claimed in claim 1, wherein the metallic outer tube is prestressed in relation to the central electrically conductive inner conductor by a thermal joining process.

7. A current feedthrough for an electrically heatable catalytic converter, wherein the catalytic converter has inside it at least one electrical conductor, configured to be electrically contacted by the current feedthrough, comprising:
   a central electrically conductive inner conductor, which is guided from an interior of the catalytic converter through an outer housing wall thereof;
   an electrical insulation layer, which surrounds the central electrically conductive inner conductor on a radially outer surface thereof; and
   a metallic outer tube, in which the central electrically conductive inner conductor and the electrical insulation layer are accommodated,
   wherein the electrical insulation layer is constructed in a number of layers in a radial direction of the current feedthrough, wherein respective individual layers are formed by materials having different coefficients of thermal expansion.

8. The current feedthrough as claimed in claim 7, wherein the electrical insulation layer has at least a first layer which produces the electrical insulation between the central electrically conductive inner conductor and the metallic outer tube, wherein the layers arranged between this first layer and the central electrically conductive inner conductor and/or the metallic outer tube have a coefficient of thermal expansion value that lies between the coefficient of thermal expansion of the first layer and a coefficient of thermal expansion of the central electrically conductive inner conductor and/or the metallic outer tube.

9. A current feedthrough for an electrically heatable catalytic converter, wherein the catalytic converter has inside it at least one electrical conductor, configured to be electrically contacted by the current feedthrough, comprising:
   a central electrically conductive inner conductor, which is guided from an interior of the catalytic converter through an outer housing wall thereof;
   an electrical insulation layer, which surrounds the central electrically conductive inner conductor on a radially outer surface thereof; and
   a metallic outer tube, in which the central electrically conductive inner conductor and the electrical insulation layer are accommodated,
   wherein the electrical insulation layer is arranged between the central electrically conductive inner conductor and the metallic outer tube and is formed from a non-metallic material,
   wherein an oxidic material of the electrical insulation layer is a porous ceramic, wherein the porous ceramic is treated with an additional substance as a pore filler.

* * * * *